United States Patent
Kava et al.

(10) Patent No.: US 10,308,237 B2
(45) Date of Patent: Jun. 4, 2019

(54) HYBRID VEHICLE LAUNCH CONTROL STRATEGY

(71) Applicant: FORD GLOBAL TECHNOLOGIES, LLC, Dearborn, MI (US)

(72) Inventors: Christopher Michael Kava, Taylor, MI (US); Alan Robert Dona, Huntington Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 15/596,712

(22) Filed: May 16, 2017

(65) Prior Publication Data

US 2018/0334160 A1 Nov. 22, 2018

(51) Int. Cl.
| | | |
|---|---|---|
| *B60W 20/19* | (2016.01) | |
| *B60W 10/06* | (2006.01) | |
| *B60W 10/08* | (2006.01) | |
| *B60W 20/13* | (2016.01) | |
| *B60W 30/18* | (2012.01) | |
| *B60W 30/186* | (2012.01) | |

(52) U.S. Cl.
CPC ............ *B60W 20/19* (2016.01); *B60W 10/06* (2013.01); *B60W 10/08* (2013.01); *B60W 20/13* (2016.01); *B60W 30/18027* (2013.01); *B60W 2510/081* (2013.01); *B60W 2510/083* (2013.01); *B60W 2510/087* (2013.01); *B60W 2510/244* (2013.01); *B60W 2510/246* (2013.01); *B60W 2540/103* (2013.01); *B60W 2540/12* (2013.01); *B60W 2710/065* (2013.01); *B60W 2710/0666* (2013.01); *B60W 2710/0677* (2013.01); *B60W 2710/083* (2013.01); *B60Y 2200/92* (2013.01); *Y10S 903/93* (2013.01)

(58) Field of Classification Search
CPC ........... B60W 20/19; B60W 30/18027; B60W 20/13; B60W 10/08; B60W 10/06; B60W 2510/244; B60W 2540/12; B60W 2540/103; B60W 2510/246; B60W 2510/087; B60W 2510/083; B60W 2510/081; B60W 2710/083; B60W 2710/065; B60W 2710/0666; B60W 2710/0677; Y10S 903/93; B60Y 2200/92
USPC ...................................... 180/271; 192/219.2
See application file for complete search history.

(56) References Cited

U.S. PATENT DOCUMENTS

| | | | | |
|---|---|---|---|---|
| 6,554,088 B2* | 4/2003 | Severinsky | ............ | B60H 1/004 180/65.23 |
| 7,243,011 B2 | 7/2007 | Koenig et al. | | |
| 9,340,200 B2 | 5/2016 | Dufford | | |
| 2005/0103549 A1* | 5/2005 | Matsuda | .................. | B60K 6/44 180/243 |
| 2015/0266479 A1 | 9/2015 | Blakeway et al. | | |
| 2016/0221577 A1 | 8/2016 | Masunaga et al. | | |

* cited by examiner

*Primary Examiner* — Nga X Nguyen
(74) *Attorney, Agent, or Firm* — David Kelley; Brooks Kushman, P.C.

(57) ABSTRACT

A vehicle includes an engine, motor, powertrain, and controller. The engine and the motor are each configured generate power within the powertrain. The controller is programmed to, in response to full depression of accelerator and brake pedals while the vehicle is stopped and the powertrain is in drive, increase engine power to a maximum power output capacity and increase a motor torque to a predetermined torque output that is less than a maximum torque capacity.

20 Claims, 3 Drawing Sheets

US 10,308,237 B2

HYBRID VEHICLE LAUNCH CONTROL STRATEGY

TECHNICAL FIELD

The present disclosure relates to control strategies for hybrid vehicles.

BACKGROUND

Hybrid vehicles may include both an internal combustion engine and one or more electric motors to generate power to propel the vehicle.

SUMMARY

A vehicle includes an engine, motor, powertrain, and controller. The engine and the motor are each configured generate power within the powertrain. The controller is programmed to, in response to full depression of accelerator and brake pedals while the vehicle is stopped and the powertrain is in drive, increase engine power to a maximum power output capacity and increase a motor torque to a predetermined torque output that is less than a maximum torque capacity.

A vehicle includes an engine, motor, drive wheel, and controller. The engine and motor are each configured deliver power to the drive wheel. The controller is programmed to, in response to full depression of accelerator and brake pedals while the vehicle is stopped, increase engine power to at least half of a maximum power capacity, increase a motor torque to a predetermined torque output that is less than a maximum torque capacity, and isolate the drive wheel from engine and motor power.

A vehicle includes an engine, motor, and controller. The engine and motor are each configured generate power. The controller is programmed to, in response to full depression of accelerator and brake pedals while the vehicle is stopped, increase engine power to at least half of a maximum power output capacity and increase a motor torque to a predetermined torque output that corresponds to increasing motor temperature to a predetermined threshold.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
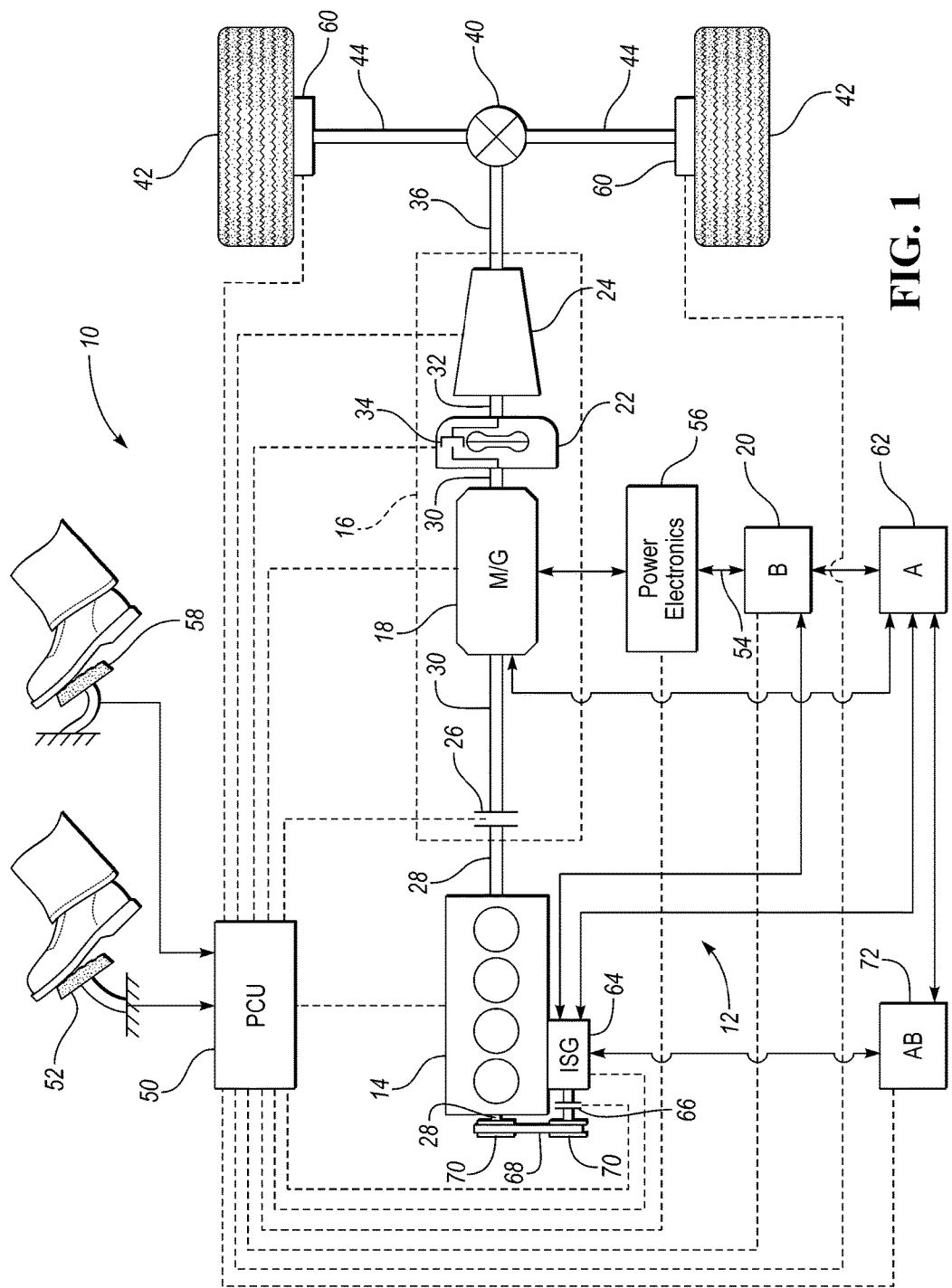
FIG. 1 is a schematic illustration of a hybrid electric vehicle having a parallel hybrid powertrain.

Referring to FIG. 1, a schematic diagram of a schematic hybrid electric vehicle (HEV) 10 having parallel hybrid powertrain is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). The transmission 16 may be placed in PRNDSL (park, reverse, neutral, drive, sport, low) via transmission range selector. As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of drive wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to the engine 14 and/or M/G 18 to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

Figure 2:
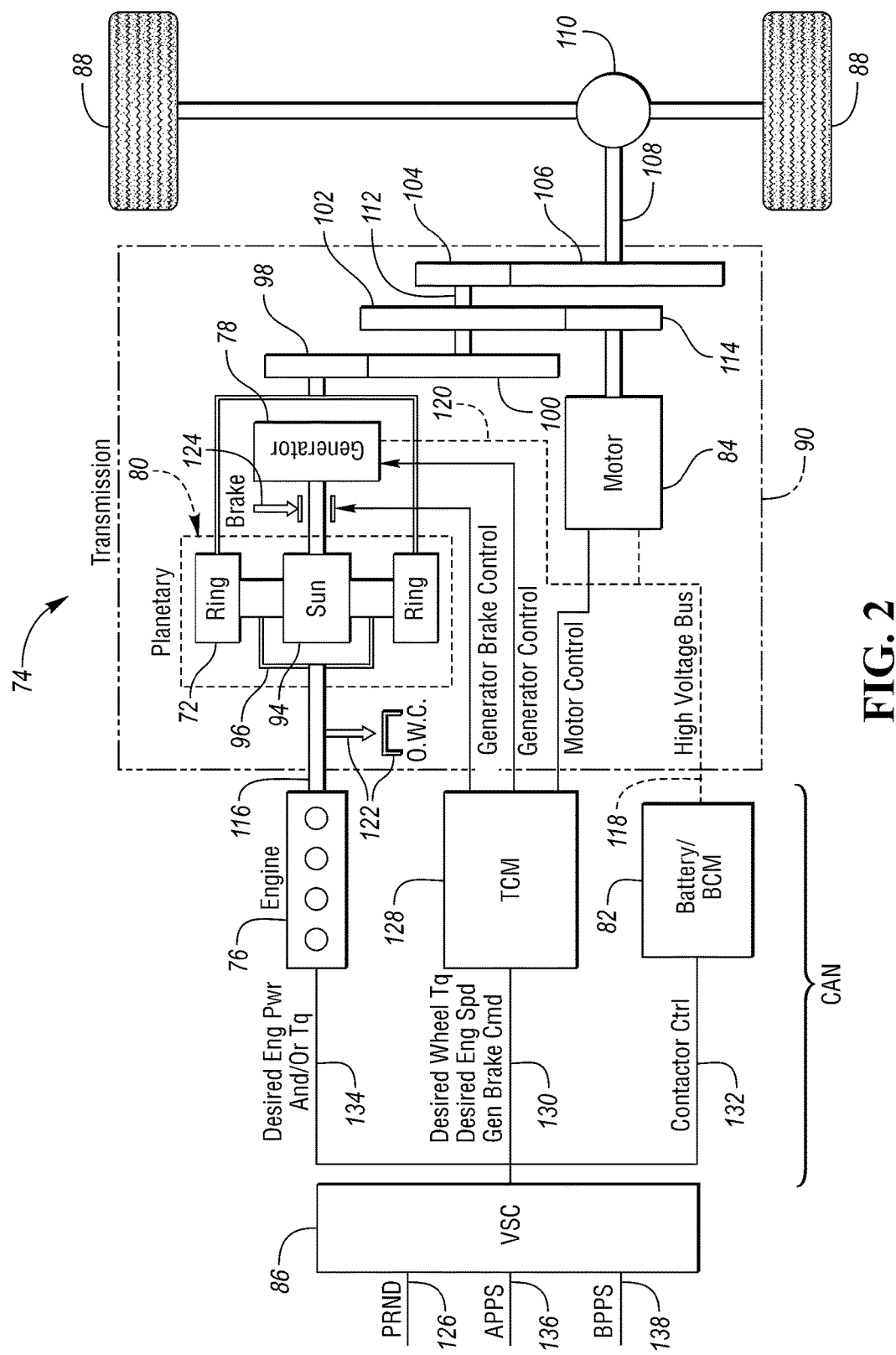
FIG. 2 is a schematic illustration a hybrid vehicle having a powersplit hybrid powertrain.

Referring now to FIG. 2, a hybrid electric vehicle 74 having a powersplit powertrain is illustrated. The powersplit powertrain may also be referred to as a series-parallel powertrain. The powertrain includes two power sources that are connected to the driveline: (1) an engine 76 and an electric-machine 78 (which may be referred to as a generator) connected together via a planetary gear arrangement 80; and (2) an electric drive system including a battery 82, an electric-machine 84 (which may be referred to as a motor) and generator 78. Battery 82 is an energy storage system for motor 84 and generator 78.

A vehicle system controller (VSC) 86 is configured to send control signals to and receive sensory feedback information from one or more of battery 82, engine 76, motor 84, and generator 78 in order for power to be provided to vehicle traction (or drive) wheels 88 for propelling the vehicle. Controller 86 controls the power source proportioning between battery 82 and engine 76 for providing power to propel the vehicle and thereby controls the state of charge (SOC) of battery 82.

Transmission 90 includes planetary arrangement 80, which includes a ring gear 92, a sun gear 94, and a carrier assembly 96. Ring gear 92 distributes torque to step ratio gears comprising meshing gear elements 98, 100, 102, 104, and 106. A torque output shaft 108 of transmission 90 is driveably connected to wheels 88 through a differential-and-axle mechanism 110. Gears 100, 102, and 104 are mounted on a counter shaft 112 with gear 102 engaging a motor-driven gear 114. Motor 84 drives gear 114. Gear 114 acts as a torque input for counter shaft 112. Engine 76 distributes torque through input shaft 116 to transmission 90. Battery 82 delivers electric power to motor 84 through power flow path 118. Generator 78 is connected electrically to battery 82 and to motor 84, as shown at 120.

While battery 82 is acting as a sole power source with engine 76 off, input shaft 116 and carrier assembly 96 are braked by an overrunning coupling (i.e., one-way clutch (OWC)) 122. A mechanical brake 124 anchors the rotor of generator 78 and sun gear 94 when engine 76 is on and the powertrain is in a parallel drive mode (i.e., both the engine 76 and the motor 84 are propelling the vehicle 74), sun gear 94 acting as a reaction element.

Controller 86 receives a signal PRND (park, reverse, neutral, drive) from a transmission range selector 126, which is distributed to transmission control module (TCM) 128, together with a desired wheel torque, a desired engine speed, and a generator brake command, as shown at 130. A battery switch 132 is closed after vehicle "key-on" startup. Controller 86 issues a desired engine power and/or torque request to engine 76, as shown at 134, which is dependent on position of an accelerator pedal, which is delivered to controller 86 via an accelerator pedal position sensor (APPS) output 136. A brake pedal position sensor (BPPS) delivers a wheel brake signal from a brake pedal to controller 86, as shown at 138. A brake system control module (not shown) may issue to controller 86 a regenerative braking command based on information from the BPPS. TCM 128 issues a generator brake control signal to generator brake 124. TCM 128 also distributes a generator control signal to generator 78.

It should be understood that the vehicles configurations described in FIGS. 1 and 2 are merely exemplary and are not intended to be limited. Other hybrid or electric vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other hybrid or electric vehicle configuration known to a person of ordinary skill in the art.

Figure 3:
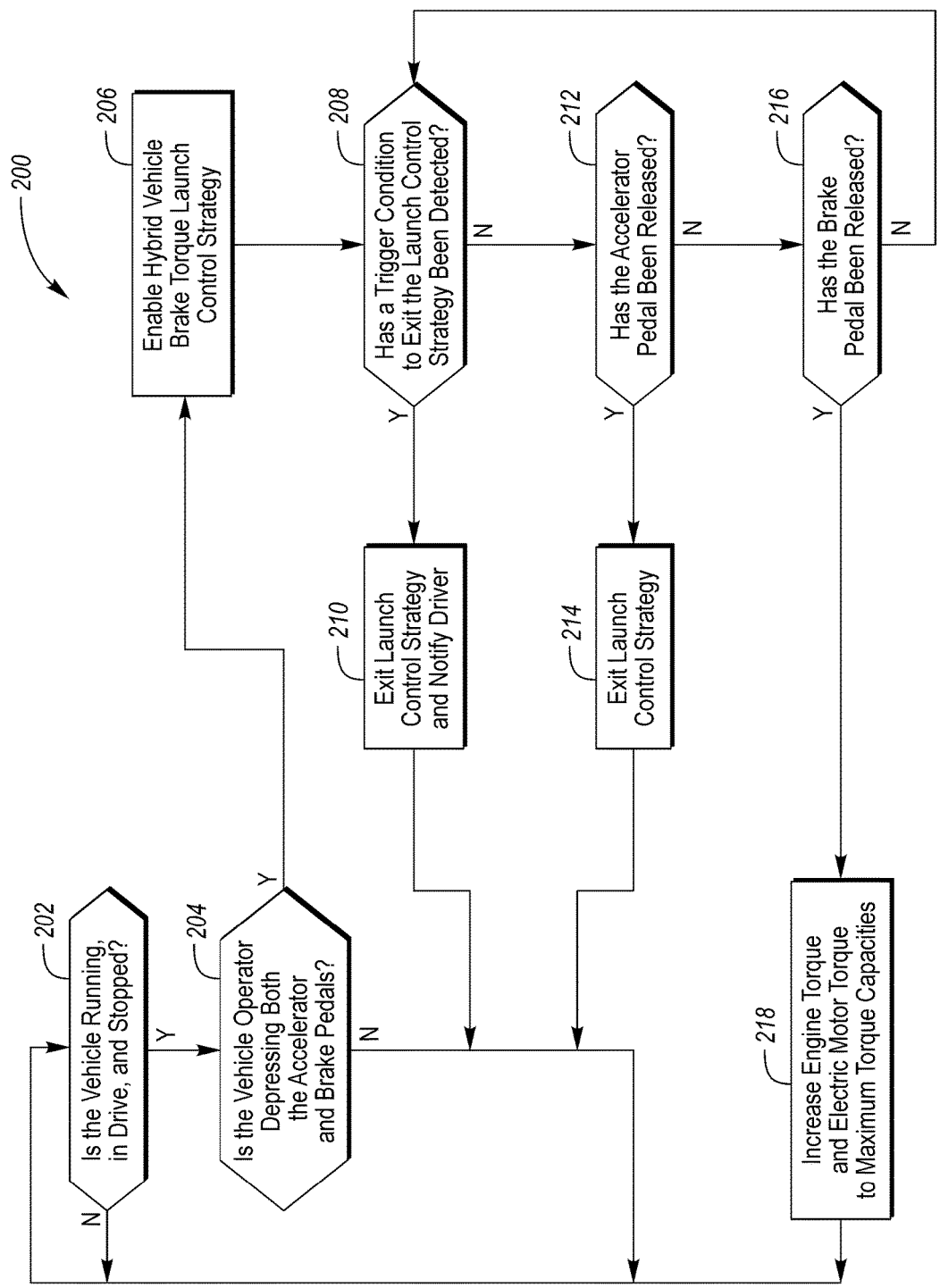
FIG. 3 is a flowchart illustrating a torque launch control strategy for a hybrid vehicle.

Referring to FIG. 3, a flowchart for a method 200 of controlling a hybrid vehicle is illustrated. The method 200 may be utilized by any type of hybrid vehicle that includes both an engine and an electric motor that is configured to generate torque and power within the powertrain and transfer the torque and power to at least one drive wheel of the vehicle, such as the hybrid vehicles illustrated in FIGS. 1 and 2. The method 200 may be stored as control logic or algorithms in one or more controllers, such as controller 50 or controller 86 described above. The one or more controllers may be programmed to implement the method 200 via sending output signals to various components to control the various components based on various conditions or states of the hybrid vehicle (or based on the conditions or states of the various components of the hybrid vehicle) received by the one or more controllers via input signals.

The method 200 begins at step 202, where it is determined if the vehicle is running, if the vehicle transmission is in drive, and if the vehicle is stopped (i.e., has a zero speed). If the vehicle is not running, the vehicle transmission is not in drive, or the vehicle is not stopped (i.e., the vehicle has non-zero speed and is moving), the method 200 cycles back to the beginning of step 202. If the vehicle is running, the vehicle transmission is in drive, and the vehicle is stopped, then the method 200 moves on to step 204, where it is determined if the vehicle operator is fully depressing both the accelerator and the brake pedals. If the vehicle operator is not fully depressing both the accelerator and brake pedals, the method 200 cycles back to the beginning of step 202 (Alternatively, the method 200 may cycle back to the beginning of step 204 if it is assumed or known that the vehicle still is running, the vehicle transmission is still in drive, and the vehicle is still stopped). If the vehicle operator is fully depressing both the accelerator and the brake pedals, the method 200 moves on to step 206 where a brake torque launch control strategy of the hybrid vehicle is enabled.

Once the brake torque launch control strategy of the hybrid vehicle is enabled at step 206, application pressure (whether it be by hydraulic, electric, or other types of mechanical system) of the vehicle's braking system is maintained, the power output of the engine (e.g., engine 14 in FIG. 1 or engine 76 in FIG. 2) is increased to a value that ranges from half (50%) to 100% of a maximum power output capacity of the engine (i.e., at least half of the maximum power output capacity), the torque of the motor (e.g., M/G 18 in the parallel configuration of FIG. 1 or motor 84 in the powersplit configuration of FIG. 2) is increased to a predetermined torque output that is less than a maximum torque capacity, and the drive wheel or wheels (e.g., wheels 42 in FIG. 1 or wheels 88 in FIG. 2) are isolated from receiving power from both the engine and the motor.

The drive wheels may be isolated from receiving engine or motor power by disconnecting an intermediate clutch that is located between the drive wheels and the engine and/or the motor (e.g., disconnect clutch 26, torque converter bypass clutch 34, a clutch located inside transmission gearbox 24 in FIG. 1). The drive wheels may, alternatively, be isolated from receiving engine power by redirecting the engine power to another source (e.g., the generator 78 in FIG. 2). The drive wheels may, alternatively, be isolated from receiving motor power by simple application of the vehicle brakes (e.g., friction brakes 60 in FIG. 1) at the wheels due to a direct mechanical link between the motor and the drive wheels.

Under a scenario where the drive wheels are isolated from receiving motor power by application of the vehicle brakes, the controller may still command the motor to generate power. However, since the wheels are being braked and unable to receive power from the motor, the motor will be able to generate torque but will be unable to rotate (i.e., will have a zero rotational speed). The commanded motor power will be dissipated in the form of heat energy under such a scenario since the motor is not able to rotate to produce rotational power (rotational power being torque multiplied by rotational speed). The predetermined torque output that motor is increased to at step 206 under such a scenario (where the motor is commanded to produce power while also having a zero rotational speed) may correspond to a motor torque output that will increase motor temperature to, but not above, a predetermined threshold via the heat dissipation. The temperature threshold may correspond to a failure temperature that will result in failure of the electric motor if the electric motor exceeds the temperature threshold. Any increase in motor torque above the predetermined torque output may then result in failure of the motor. Therefore, the predetermined torque output may also correspond with a highest allowable torque without failure under a scenario where the motor is producing power while also having a zero rotational speed. Alternatively, the temperature threshold may be set to a safety factor that is below the failure temperature. For example, the torque of the electric motor, where the motor is producing power while also having a zero rotational speed, may be set such that the motor temperature will increase to, but not above, a temperature that is five degrees below a failure temperature.

Once the power output of the engine is increased to a value that ranges from half (50%) to 100% the maximum power capacity of the engine, the torque of the motor is increased to the predetermined torque output, and the drive wheel or wheels are isolated from receiving power from both the engine and the motor at step 206, the method 200 moves on to step 208. At step 208, it is determined if a trigger condition to exit the launch control strategy has been detected, while the accelerator and brake pedals remain fully depressed, the transmission remains in drive, and the vehicle remains stopped. If a trigger condition to exit the launch control strategy has been detected, the method 200 moves on to step 210 where the hybrid vehicle exits the brake torque launch control strategy and cycles back to the beginning of step 202. The engine power may also be decreased to an idle value (e.g., 10%-25% of the maximum power capacity of the engine) and the motor torque (and motor power) may also be decreased to zero at step 210.

The vehicle may also include a system to notify the vehicle operator that the vehicle has exited the brake torque launch control strategy. The notification system may be visual (e.g., lights on the dashboard), audible (e.g., a spoken message transmitted through speakers), or haptic (e.g., motors that cause vibrations in the seats or steering wheel).

The trigger condition at step 208 may be the elapsing of a predetermined time period, while the accelerator and brake pedals are fully depressed and the vehicle is stopped. If the predetermined time period has elapsed, the method 200 moves on to step 210. The predetermined time period may be a safety feature to prevent damage or failure of the engine and/or the motor that may be caused by maintaining high power and/or torque levels (that may result in overheating or excessive wear and tear) while the vehicle is stopped.

Alternatively, the trigger condition at step 208 may be the temperature of either the engine or the motor exceeding a threshold, while the accelerator and brake pedals remain fully depressed, the transmission remains in drive, and the vehicle remains stopped. If the engine or motor temperatures (which may be determined via a temperature sensors that are configured to communicate with the controller) exceed a respective threshold, the method 200 moves on to step 210. The temperature thresholds of the engine or motor may also be a safety features to prevent damage or failure of the engine and/or the motor that may be caused by maintaining high power and/or torque levels (that may result in overheating or excessive wear and tear) while the vehicle is stopped.

Under a scenario where the drive wheels are isolated from receiving engine power by redirecting the engine power to rotate a generator which in turn recharges a battery (e.g., the engine 76, generator 78, and battery 82 in FIG. 2), the trigger condition at step 208 may be may be either the battery obtaining a full charge or the battery temperature exceeding a threshold, while the accelerator and brake pedals remain fully depressed, the transmission remains in drive, and the vehicle remains stopped. If the battery obtains a full charge or the battery temperature exceeds the threshold, the moves on to step 210. The temperature threshold of the battery may also be a safety feature to prevent damage or failure of the battery that may be caused if the battery is operating at excessively high temperatures. Exiting the brake torque launch control strategy when the battery has obtained full charge may also be a safety feature to prevent damage to the battery, which may be caused by excessive charging.

If a trigger condition to exit the launch control strategy has not been detected at step 208, the method 200 moves on to step 212 where it is determined if the accelerator pedal has been released when the vehicle is stopped, while depression of the brake pedal is maintained with the transmission in drive. If the accelerator pedal has been released and depression of the brake pedal is maintained, the method 200 moves on to step 214, where the hybrid vehicle exits the brake torque launch control strategy and cycles back to the beginning of step 202. The engine power may also be decreased to an idle value (e.g., 10%-25% of the maximum power capacity of the engine) and the motor torque (and motor power) may also be decreased to zero at step 214.

If the accelerator pedal has not been released and depression of the brake pedal is maintained, the method 200 moves on to step 216, where it is determined if the brake pedal has been released when the vehicle is stopped, while depression of the accelerator pedal is maintained with the transmission in drive. If the brake pedal has not been released and depression of the accelerator pedal is maintained, the method 200 cycles back to the beginning of step 208. If the brake pedal has been released and depression of the accelerator pedal is maintained, the method 200 moves on to step 218 where it is determined that the vehicle operator has requested to launch the vehicle.

At step 218, the torque of motor is increased from the predetermined torque output to the maximum torque output capacity of the motor and the torque of the engine is increased to a maximum torque output capacity of the engine. The torque of the engine and the motor may both be increased to full capacity at an accelerated or maximum potential rate to quickly increase the torque at the drive wheels to a maximum potential amount of torque that is capable of being applied at the drive wheels. In hybrid vehicles that include more than one electric motor and/or generator than may be operated as an electric motor (e.g., the generator 78 and motor 84 in FIG. 2), the method 200 may include increasing the torque output of all of the motors and/or generators to maximum torque output capacities and transferring the torque of all of the motors and/or generators to the drive wheels. Once the vehicle has launched, the method 200 cycles back to the beginning of step 202.

It should be understood that the flowchart in FIG. 3 is for illustrative purposes only and that the method 200 should not be construed as limited to the flowchart in FIG. 3. Some of the steps of the method 200 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    an engine and a motor each configured generate power within a vehicle powertrain; and
    a controller programmed to, in response to full depression of accelerator and brake pedals while the vehicle is stopped and the powertrain is in drive, increase engine power to a maximum power output capacity and increase a motor torque to a predetermined torque output that is less than a maximum torque capacity.

2. The vehicle of claim 1, wherein the controller is further programmed to, in response to release of the brake pedal while full depression of the accelerator pedal is maintained, increase motor torque from the predetermined torque output to the maximum torque capacity.

3. The vehicle of claim 2, wherein the controller is further programmed to, in response to release of the brake pedal while full depression of the accelerator pedal is maintained, increase an engine torque to a maximum torque output capacity of the engine.

4. The vehicle of claim 1, wherein the controller is further programmed to, in response to a predetermined time period elapsing while the accelerator and brake pedals are fully depressed and the vehicle is stopped, decrease engine power to an idle value and decrease motor torque to zero.

5. The vehicle of claim 1 further comprising a traction battery and a generator, wherein the generator is configured to charge the battery, the engine rotates the generator to charge the battery while the vehicle is stopped, and the controller is further programmed to, in response to the battery obtaining a full charge while the accelerator and brake pedals are fully depressed and the vehicle is stopped, decrease the engine power to an idle value and decrease the motor torque to zero.

6. The vehicle of claim 1 further comprising a traction battery and a generator, wherein the generator is configured to charge the battery, the engine rotates the generator to charge the battery while the vehicle is stopped, and the controller is further programmed to, in response to the battery exceeding a temperature threshold while the accelerator and brake pedals are fully depressed and the vehicle is stopped, decrease the engine power to an idle value and decrease the motor torque to zero.

7. The vehicle of claim 1, wherein the controller is further programmed to, in response to release of the accelerator pedal while full depression of the brake pedal is maintained, decrease the engine power to an idle value and decrease the motor torque to zero.

8. The vehicle of claim 1, wherein the predetermined torque output corresponds to increasing motor temperature to a predetermined threshold during a condition where the motor is both generating torque and has a zero rotational speed.

9. A vehicle comprising:
    an engine and a motor each configured deliver power to a drive wheel; and
    a controller programmed to, in response to full depression of accelerator and brake pedals while the vehicle is stopped, increase engine power to at least half of a maximum power capacity, increase a motor torque to a predetermined torque output that is less than a maximum torque capacity, and isolate the drive wheel from engine and motor power.

10. The vehicle of claim 9, wherein the controller is further programmed to, in response to release of the brake pedal while full depression of the accelerator pedal is maintained, increase motor torque from the predetermined torque output to a maximum torque capacity of the motor and transfer the motor torque to the drive wheel.

11. The vehicle of claim 10, wherein the controller is further programmed to, in response to release of the brake pedal while full depression of the accelerator pedal is maintained, increase an engine torque to a maximum torque output capacity of the engine and transfer the engine torque to the drive wheel.

12. The vehicle of claim 9, wherein the controller is further programmed to, in response to a predetermined time period elapsing while the accelerator and brake pedals are fully depressed and the vehicle is stopped, decrease engine power to an idle value and decrease motor torque to zero.

13. The vehicle of claim 9 further comprising a traction battery and a generator, wherein the generator is configured to charge the battery, the engine rotates the generator to charge the battery while the vehicle is stopped, and the controller is further programmed to, in response to the battery obtaining a full charge while the accelerator and brake pedals are fully depressed and the vehicle is stopped, decrease the engine power to an idle value and decrease the motor torque to zero.

14. The vehicle of claim 9 further comprising a traction battery and a generator, wherein the generator is configured to charge the battery, the engine rotates the generator to charge the battery while the vehicle is stopped, and the controller is further programmed to, in response to the battery exceeding a temperature threshold while the accelerator and brake pedals are fully depressed and the vehicle is stopped, decrease the engine power to an idle value and decrease the motor torque to zero.

15. The vehicle of claim 9, wherein the controller is further programmed to, in response to release of the accelerator pedal while full depression of the brake pedal is maintained, decrease the engine power to an idle value and decrease the motor torque to zero.

16. The vehicle of claim 9, wherein the predetermined torque output corresponds to increasing motor temperature to a predetermined threshold during a condition where the motor is both generating torque and has a zero rotational speed.

17. A vehicle comprising:
an engine and a motor each configured generate power; and
a controller programmed to, in response to full depression of accelerator and brake pedals while the vehicle is stopped, increase engine power to at least half of a maximum power output capacity and increase a motor torque to a predetermined torque output that corresponds to increasing motor temperature to a predetermined threshold.

18. The vehicle of claim 17, wherein the controller is further programmed to, in response to release of the brake pedal while full depression of the accelerator pedal is maintained, increase motor torque from the predetermined torque output to a maximum torque capacity output of the motor and increase an engine torque to a maximum torque output capacity of the engine.

19. The vehicle of claim 17, wherein the controller is further programmed to, in response to a predetermined time period elapsing while the accelerator and brake pedals are fully depressed and the vehicle is stopped, decrease engine power to an idle value and decrease motor torque to zero.

20. The vehicle of claim 17, wherein the controller is further programmed to, in response to release of the accelerator pedal while full depression of the brake pedal is maintained, decrease the engine power to an idle value and decrease the motor torque to zero.

* * * * *